United States Patent [19]
Curtis
[11] 3,859,601
[45] Jan. 7, 1975

[54] SIGNAL HANDLING ARRANGEMENT AND FREQUENCY DIVERSITY COMBINING ARRANGEMENTS UTILISING THE SAME

[75] Inventor: Anthony Thomas Curtis, Essex, England
[73] Assignee: The Marconi Company Limited, Chelmsford, Essex, England

[22] Filed: Apr. 11, 1973
[21] Appl. No.: 350,094

[30] Foreign Application Priority Data
Apr. 11, 1972 Great Britain .................... 16738/72

[52] U.S. Cl. ................. 325/305, 325/367, 325/431, 343/205
[51] Int. Cl. ............................................. H04b 7/02
[58] Field of Search ............................ 343/205, 206; 325/303–304, 305–307, 379–381, 387–430, 431–434, 489

[56] References Cited
UNITED STATES PATENTS
2,513,811 7/1950 Matthews ............................ 325/305
2,622,191 12/1952 Van Zelst et al. .................. 325/431
3,281,698 10/1966 Rose, Jr. et al. ................ 325/489 X
3,619,786 11/1971 Wilcox ........................... 325/387 X
3,743,941 7/1973 Gans et al. .......................... 325/305

*Primary Examiner*—Benedict V. Safourek
*Attorney, Agent, or Firm*—Baldwin, Wight & Brown

[57] ABSTRACT

A signal handling arrangement for use in a diversity predetection combining arrangement in which input signals are fed in parallel to two balanced mixers. The output from one mixer feeds a second input of the other mixer through a band pass filter which passes one sideband and the output from the second mixer feeds a second input of the first mixer through a filter capable of tracking in response to the frequency of the input signals applied to it so as to maintain passage of signals in the sideband of the output from the second mixer which corresponds to the sideband passed by the first filter thereby alleviating problems due to phase shifting between outputs from two identical frequency diverse arrangements.

6 Claims, 5 Drawing Figures

SIGNAL HANDLING ARRANGEMENT AND FREQUENCY DIVERSITY COMBINING ARRANGEMENTS UTILISING THE SAME

This invention relates to frequency diversity predetection combining arrangements and signal handling arrangements used in the same.

Figure 1:
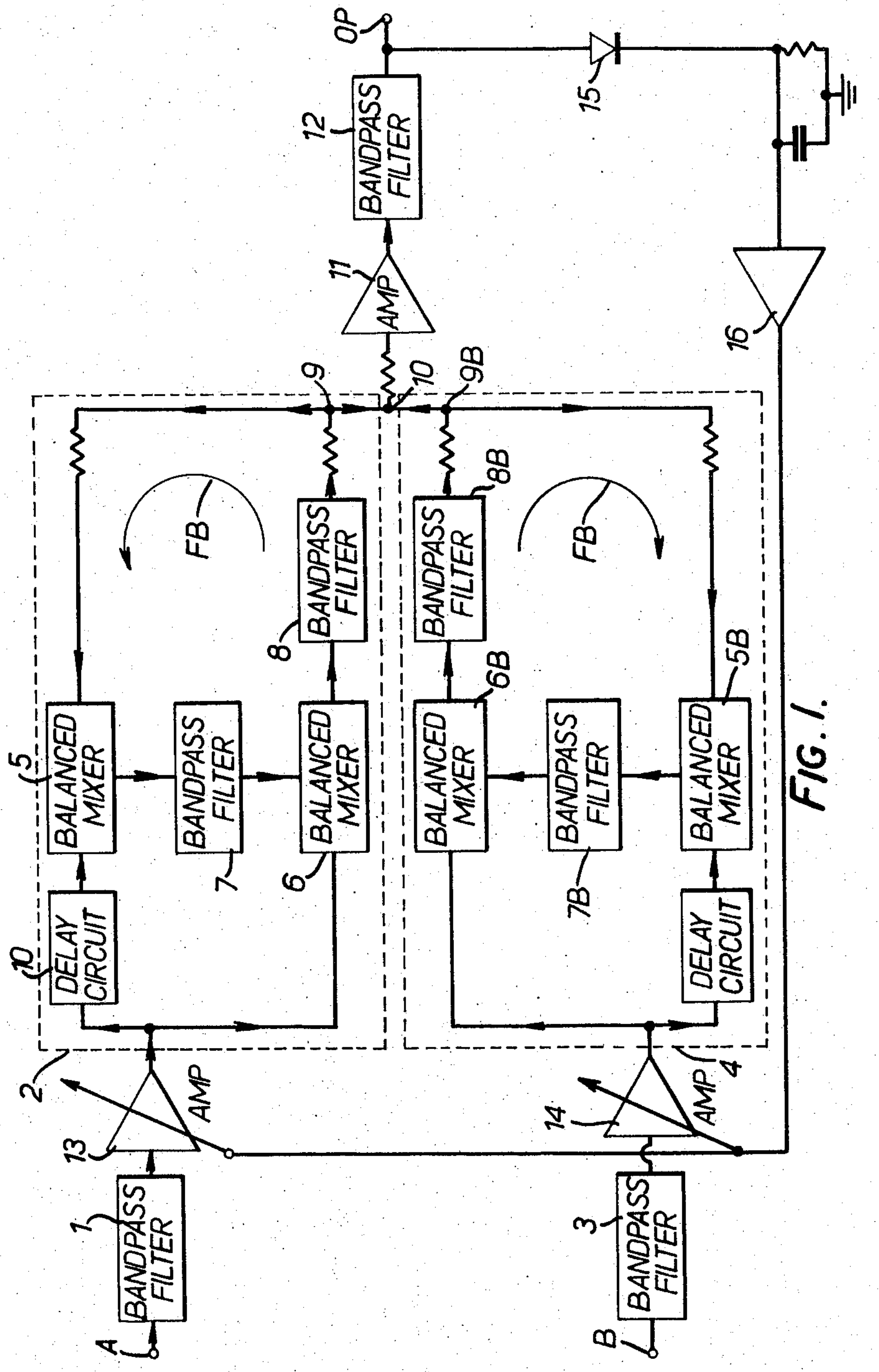

A typical known frequency diversity predetection combining arrangement is illustrated in FIG. 1.

Referring to FIG. 1, two input terminals A and B are provided to receive signals in two frequency diverse channels. The frequency diverse channels applied to terminals A and B are required to be combined at a common output terminal OP. Terminal A is connected via a band pass filter 1, to a signal handling circuit within the dashed line block 2. Terminal B is similarly connected via a band pass filter 3 to a signal handling circuit shown within dashed line block 4.

The signal handling circuits 2 and 4 are similar in detail and only signal handling circuit 2 will be specifically described, like parts in signal handling circuit 4 being identified by like references but with the suffix b. Within the signal handling circuit 2, input signals are applied in parallel to two balanced mixers (otherwise known as four quadrant multipliers) 5 and 6. A second input for balanced mixer 6 is obtained from balanced mixer 5, via a narrow band pass filter 7, which is arranged to pass the lower side tone of the output of balanced mixer 5. The band pass of filter 7 is narrow compared with the expected band width of input signals applied to input terminal A. In practice the band width of filter 7 is commonly 0.01 percent of the band width of signals expected to be applied to terminal A. Output from balanced mixer 6 is applied via a band pass filter 8 to an output terminal 9. Band pass filter 8 is again arranged to pass the lower side tone of balanced mixer 6, but has a band width which is wider than that of filter 7, sufficiently wide in practice to pass the expected excursions of the input signals applied to input terminal A. The second input for balanced mixer 5 is derived from the output of band pass filter 8. Mixer 5, filter 7, mixer 6 and filter 8 form a positive feedback loop as indicated by the arrow 9. Delay circuit 10 at the input to mixer 5 is included to balance the delay inherently suffered by signals applied to the second input of mixer 5 due to the transit time effects of mixer 6 and band pass filter 8.

Output terminals 9 and 9B are connected together at 10 and the signals thus combined are passed via an amplifier 11 and a band pass filter 12 to the combined output terminal OP for detection It will be noted that between band pass filter 1 and signal handling circuit 2 is an amplifier 13 of variable gain (i.e., an AGC amplifier), whilst between band pass filter 3 and signal handling circuit 4 is a further amplifier 14 of variable gain. Amplifiers 13 and 14 are connected jointly to be controlled by an AGC circuit consisting of a rectifier 15 and amplifier 16, connected to sample output signals at common output terminal OP. Amplifiers 13 and 14 and the AGC circuit 15 and 16 are provided to achieve a ratio squaring effect if the transfer characteristics of the signal handling circuits 2 and 4 are square law, as is well known.

To explain the operation of the frequency diversity predetection combining arrangement illustrated in FIG. 1, it is convenient to consider a practical example of input frequencies applied to input terminals A and B.

It is therefore assumed that the frequency of the channel applied to input terminal A is 70 MHz with modulation and instantaneous phase angle $\alpha$ and that the signal at the output terminal 9 is 59.3 MHz with modulation and instantaneous phase angle $\theta$. By virtue of the action of the mixer 5, therefore, the signal applied to band pass filter 7 is 10.7 MHz with instantaneous phase angle $\alpha - \theta$. Because of the effect of delay circuit 10 in equalising the delay experienced by the two input signals to mixer 5, the modulation components cancel.

Thus the two signals applied to balanced mixer 6 are 70 MHz with modulation and instantaneous phase angle $\alpha$, from input terminal A, and 10.7 MHz without modulation and of instantaneous phase angle $\alpha - \theta$, from the output of balanced mixer 5 via filter 7. The lower side band output of mixer 6 applied to band pass filter 8 is, 59.3 MHz with modulation and instantaneous phase angle $\theta$. Thus the instantaneous phase angle of the incoming signal applied to terminal A has been removed and the previously assumed signal at the output of balanced mixer 6 of 59.3 MHz with modulation and instantaneous phase angle $\theta$, established.

Similarly, if the second channel applied to terminal B was of 70 MHz with modulation and of instantaneous phase angle $\beta$, then the output of balanced mixer 6B would be 59.3 MHz with modulation M and instantaneous phase angle $\theta$.

If now the second channel applied to input terminal B is taken to have a centre frequency of 70 MHz + $\Delta$F, then the frequency at the output of band pass filter 7B will be 10.7 MHz + $\Delta$F. The output signal from balanced mixer 6B applied via band pass filter 8B to output terminal 9B will be 59.3 MHz with modulation M. However, due to difference between the frequencies of the signals passing through band pass filters 7 and 7B, the output signals applied to output terminals 9 and 9B will acquire relatively different phase shifts, due to the phase/frequency characteristics of the filters, 7, 7B.

Thus the second channel output at output terminal 9B will have a phase shift dependent upon the magnitude of the difference in the frequencies of the signals applied to band pass filters 7 and 7B and upon the band widths of the filters.

The magnitude of this effect is such that the tolerance of frequency difference between the input signals applied to terminals A and B is less than 1 KHz, which is undesirably limiting for a frequency diversity system.

The present invention seeks to provide improved signal handling arrangements and frequency diversity predetection combining arrangements utilising the same by which this difficulty may be reduced.

According to this invention a signal handling arrangement suitable for use in a frequency diversity predetection combining arrangement comprises two balanced mixers, means for applying input signals in parallel to both mixers, means for deriving a second input for one of said mixers from the output of the other via band pass filter means adapted to pass signals in one of the sidebands of the output from said other mixer, further band pass filter means connected to apply output from said one mixer as a second input for said other mixer, said further band pass filter means being capable of tracking in response to the frequency of input signals applied thereto over a range of frequencies so as to maintain passage of signals in the sideband of the output from said one mixer which corresponds to said one sideband of the output of said other mixer and output means for taking output signals from the output of said first mentioned band pass filter means.

In one embodiment of the invention said further band pass filter means may be a phase locked loop circuit.

In another embodiment of the invention said further band pass filter means comprises a sideband tracking filter connected to be controlled by output signals from a frequency discriminator one input of which is connected to the output of said one mixer and a second input of which is connected to an oscillator whose frequency of oscillation corresponds at least approximately to the centre frequency of said sideband tracking filter.

In another preferred embodiment of the invention said further band pass filter means comprises a phase locked loop circuit connected to apply output from said one mixer as a second input to said other mixer and as one input to a further balanced mixer, a second input for which is derived via a 90° phase shifter from the output of said one balanced mixer, means being provided for utilising output from said further balanced mixer to control the attenuation provided by a linearly variable attenuator connected in the path between said first mentioned band pass filter means and both said one mixer and said output means.

Preferably said linearly variable attenuator is a PIN diode attenuator in which case control signals from said further balanced mixer are passed to said PIN diode attenuator via an amplifying low pass filter.

In all cases the sidebands of the outputs of the mixers may be either upper sidebands or lower sidebands provided in any one case corresponding sidebands are utilised. Preferably, however, the sidebands are lower sidebands.

According to a feature of this invention a frequency diversity signal combining arrangement comprises a plurality of signal handling arrangements as above described, one for each frequency diversity signal channel to be combined, and means for combining output signals taken from the outputs of the first mentioned band pass filter means of each for demodulation.

A frequency diversity combining arrangement in accordance with the present invention may be adapted to exhibit optimal ratio or ratio squaring action, as known per se, by the provision of AGC amplifiers, one in each input path from a diversity channel to the two balanced mixers of a signal handling arrangement which AGC amplifiers are controlled by an AGC detector connected to derive its input from the common output of all of said signal handling arrangements.

Figure 2:
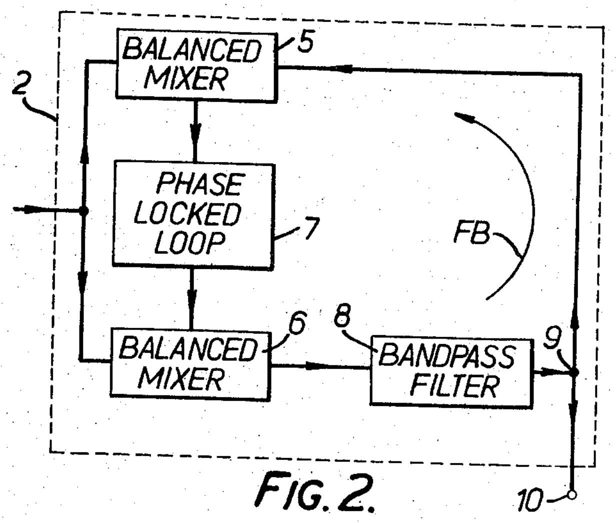
Figure 3:
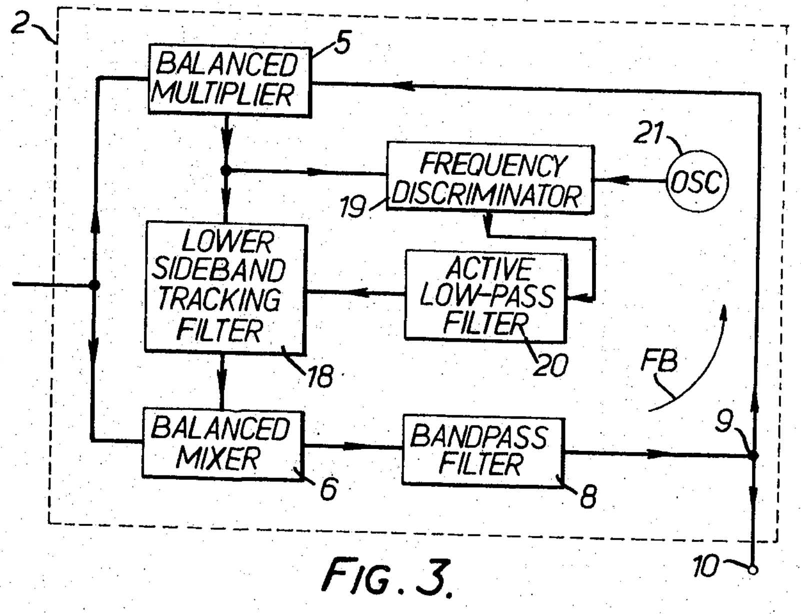
Figure 4:
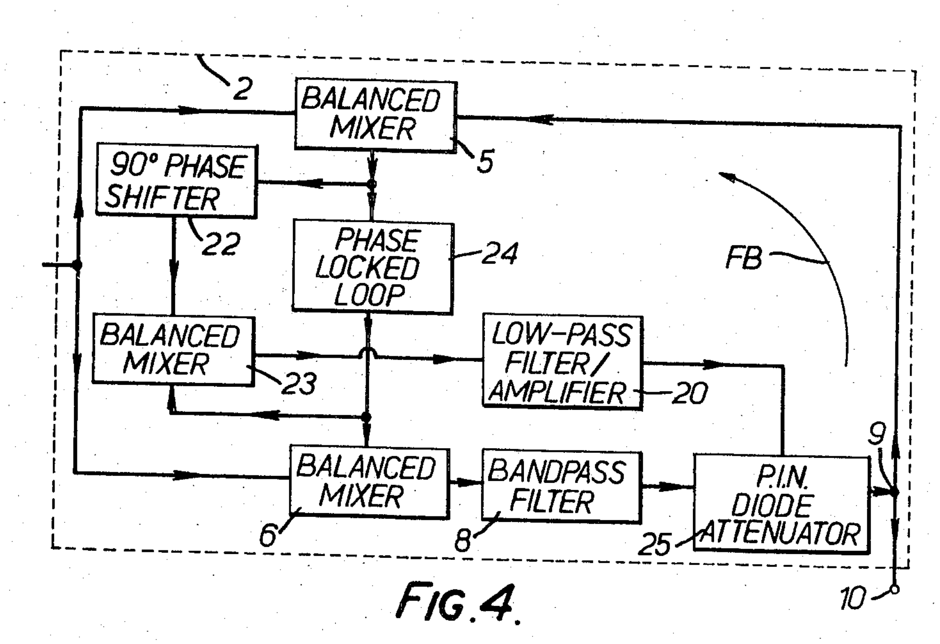
Figure 5:
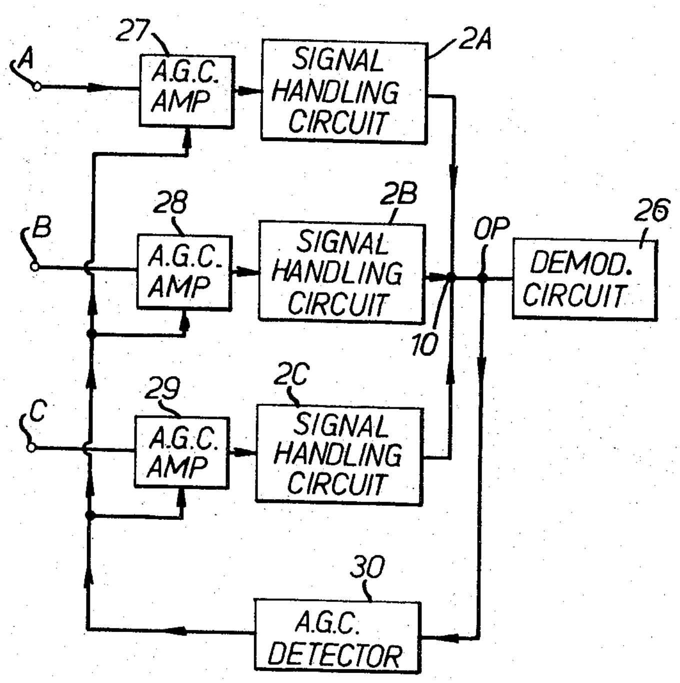

The invention is illustrated in and further described with reference to FIGS. 2, 3, 4 and 5 of the accompanying drawings in which, FIG. 2 is a simplified block schematic diagram of a simple form of signal handling arrangement in accordance with the present invention, FIGS. 3 and 4 are simplified block schematic diagrams of two further signal handling arrangements in accordance with the present invention, and FIG. 5 is a simplified block schematic diagram of a frequency diversity signal combining arrangement in which the ratio or ratio squaring capability of signal handling arrangements as shown in FIG. 3 or 4 is exploited.

In all FIGS. like references are used to denote like parts, but in FIGS. 2 to 5 detail inessential to an explanation of the invention, such as delay circuit 10, have been omitted to avoid unnecessay complication.

Referring to FIG. 2, the essential difference between the circuit arrangement shown therein and the circuit arrangement shown within dashed line block 2 of FIG. 1 is that the narrow band pass filter 7 is replaced by a phased locked loop circuit 17 designed to act as a tracking filter which exhibits a narrow band width of the same order as that of filter 7 inFIG. 1, required for loop regeneration, but trackable at least over a tracking range corresponding to the difference in input frequency which may be expected between input signal frequencies applied to this signal handling arrangement and input signal frequencies applied to other signal handling arrangements with which it is intended to be used in a frequency diversity combining arrangement. The use of a phase locked loop 17 results in a constant output level being obtained which prevents the ratio or ratio squaring capability exhibited by the signal handling arrangement of FIG. 1 (when combined with other signal handling arrangements in a frequency diversity signal combining arrangement) being obtained. For this reason the simple arrangement of FIG. 2 is in many cases not preferred.

Referring to FIG. 3, in this case the narrow band pass filter 7 of FIG. 1 is replaced by a lower sideband tracking filter 18 which has a band width corresponding to that of filter 7 in FIG. 1, but capable of being tracked over a range of frequencies corresponding to the difference in input frequency which may be expected between input signal frequencies applied to this signal handling arrangement and input signal frequencies applied to other signal handling arrangements with which it is intended to be used in a frequency diversity signal combining arrangement. The tracking filter 18 is controlled as to its tracking by the output of a frequency discriminator 19 via an active low pass filter 20. Frequency discriminator 19 derives one input directly from the output of balanced mixer 5 and a second input from the output of an oscillator 21 whose frequency of oscillation is arranged to be the centre frequency of the tracking filter 18. In the case of the circuit of FIG. 3, the tracking filter 18 maintains the narrow band width required for loop generation, whilst its transfer function is amplitude linear so as to maintain the optimal ratio or ratio squaring capability of the signal handling arrangements when connected in a manner similar to that shown in FIG. 1. In FIG. 3, one or more other signal handling arrangements, similar to that shown in FIG. 3 would be connected to terminal 10 of FIG. 3 to form a frequency diversity signal combining arrangement as with the arrangement shown in FIG. 1.

Referring to FIG. 4, output from balanced mixer 5 is in this case connected via a 90° phase shifter 22 to one input terminal of a balanced mixer 23 and via a phase locked loop circuit 24 to a second input terminal of the balanced mixer 23. Output from the phase locked loop circuit 24 is also applied as the second input to balanced mixer 6. Output from balanced mixer 6 is connected via band pass filter 8, corresponding to band pass filter 8 in FIG. 1, to a PIN diode attenuator 25. PIN diode attenuator 25 is controlled by output signals from the balanced mixer 23 applied to it through an amplifying low pass filter 20. Output from PIN diode attenuator 25 is connected both to output terminal 9 and to the second input of balanced mixer 5. Again to form a frequency diversity combining arrangement, one or more other signal handling arrangements would be connected to terminal OP.

In the operation of the circuits in FIG. 4, the 90° phase shifter 22 and the balanced mixer 23 constitute between them a synchronous detector which provides an output to the low pass filter/amplifier 20 which is linearly proportional to the output of balanced mixer 5. The output of balanced mixer 5, is, of course, linearly proportional to the voltage of the input signal applied to the signal handling arrangement. Consequently the PIN diode attenuator 25 (which itself has a linear action) is controlled by the input signal applied to the signal handling arrangement via the sychronous detector constituted by phase shifter 22 and balanced mixer 23 and in addition receives an a.c. input which is proportional to the voltage of input signals applied. It follows, therefore, that the output of the PIN diode attenuator 25 is proportional to the square of the applied input signal which is the condition required to provide an optimal ratio or ratio squared capability when more than one similar signal handling arrangements are combined to form a frequency diversity signal combining arrangement.

Referring to FIG. 5, this shows three signal handling circuits 2A, 2B and 2C each of which may either be as shown in FIG. 3 or as shown in FIG. 4, connected to combine signals from different diversity channels connected to input terminals A, B and C to provide a common output at output terminal OP. Output terminal OP is connected to a demodulator 26. In order to take advantage of the ratio or ratio squaring capability of the signal handling circuits 2A, 2B and 2C when combined as shown, as known per se, AGC amplifiers 27, 28 and 29 are connected between input terminals A, B and C and the signal handling circuits 2A, 2B and 2C, which AGC amplifiers are controlled by an AGC detector arrangement 30 connected to derive input from common output lead OP. The arrangement is in fact similar to that of AGC amplifiers 13, 14 and detector arrangement 15, 16 of FIG. 1. As known per se the whole arrangement is such that the levels of signals applied to the two mixers in each of the signal handling circuits 2A, 2B and 2C are such that optimal ratio or ratio squaring action is obtained.

I claim:

1. A signal handling arrangement suitable for use in a frequency diversity predetection combining arrangement comprising two balanced mixers, means for applying input signals in parallel to both mixers, means for deriving a second input for one of said mixers from the output of the other via band pass filter means adapted to pass signals in one of the sidebands of the output from said other mixer, further band pass filter means connected to apply output from said one mixer as a second input for said other mixer, and output means for taking output signals from the output of said first mentioned band pass filter means wherein said further band pass filter means is capable of tracking in response to the frequency of input signals applied thereto over a range of frequencies so as to maintain passage of signals in the sideband of the output from said one mixer which corresponds to said one sideband of the output of said other mixer and comprises a phase locked loop circuit connected to apply output from said one mixer as a second input to said other mixer and as one input to a further balanced mixer, a second input for which is derived via a 90° phase shifter from the output of said one balanced mixer, means being provided for utilising output from said further balanced mixer to control the attenuation provided by a linearly variable attenuator connected in the path between said first mentioned band pass filter means and both said one mixer and said output means.

2. An arrangement as claimed in claim 1 and wherein said linearly variable attenuator is a PIN diode attenuator and control signals from said further balanced mixer are passed to said PIN diode attenuator via an amplifying low pass filter.

3. An arrangement as claimed in claim 1 and wherein the sideband of the outputs of the mixers are lower sidebands.

4. A frequency diversity signal combining arrangement comprising a plurality of signal handling arrangements each as claimed in claim 1, one for each frequency diversity signal channel to be combined, and means for combining output signals taken from the outputs of the first mentioned band pass filter means of each for demodulation.

5. A frequency diversity combining arrangement as claimed in claim 4 and including AGC amplifiers, one in each input path from a diversity channel to the two palanced mixers of a signal handling arrangement which AGC amplifiers are controlled by an AGC detector connected to derive its input from the common output of all of said signal handling arrangements.

6. A signal handling arrangement suitable for use in frequency diversity predetection combining arrangement, comprising in combination:

a pair of balanced mixers each having a pair of inputs and an output;

means for applying an input signal in parallel to both mixers;

phase locked loop means connecting the output of one mixer to the second input of the other mixer for tracking over a range corresponding to the difference in input frequency which may be expected in a frequency diversity combining system while maintaining passage of signals in one of the sidebands of the output from the other mixer;

bandpass filter means connected to the output of said other mixer for passing said signals in said one of the sidebands of said other mixer;

output means connected to said bandpass filter means for providing the second input to said one mixer and comprising a linearly variable attenuator;

a further balanced mixer having a pair of inputs and an output;

a 90° phase shifter connected to the output of said one mixer and providing one input to said further mixer, the further mixer having its second input connected to the output of said phase locked loop means; and means connecting the output of said further mixer to said attenuator for maintaining an output from said attenuator which is proportional to the square of the input signal.

* * * * *